(12) United States Patent
Strong et al.

(10) Patent No.: US 11,084,517 B1
(45) Date of Patent: Aug. 10, 2021

(54) UNIVERSAL STEERING WHEEL COVER

(71) Applicant: Hopkins Manufacturing Corporation, Emporia, KS (US)

(72) Inventors: Lynn Curtis Strong, Auburn, KS (US); Kyle M. Bennett, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 17/088,935

(22) Filed: Nov. 4, 2020

(51) Int. Cl.
   *B62D 1/06* (2006.01)
(52) U.S. Cl.
   CPC ..................... *B62D 1/06* (2013.01)
(58) Field of Classification Search
   CPC ....................................................... B62D 1/06
   See application file for complete search history.

(56) References Cited

U.S. PATENT DOCUMENTS

| | | | |
|---|---|---|---|
| 5,945,206 A * | 8/1999 | Jogan | B29C 45/1676 |
| | | | 428/215 |
| 2009/0095121 A1* | 4/2009 | Huang | B62D 1/06 |
| | | | 74/558 |
| 2011/0219910 A1* | 9/2011 | Wu | B62D 1/06 |
| | | | 74/558 |
| 2017/0197651 A1* | 7/2017 | Huang | B62D 1/06 |
| 2019/0283791 A1* | 9/2019 | Strong | B62D 1/06 |

* cited by examiner

*Primary Examiner* — Vicky A Johnson
(74) *Attorney, Agent, or Firm* — Hovey Williams LLP

(57) ABSTRACT

A steering wheel cover has an inner core and an outer casing. The inner core has a tubular body portion and a pair of spaced-apart spines. The tubular body portion and spines together define an open-ended hollow channel that can be placed over a vehicle steering wheel via a gap between the spines. The inner core also has a plurality of crush ribs extending inwardly from an inner surface of the body portion. The crush ribs allow the inner core to be easily placed over multiple different sized steering wheels without slipping or otherwise moving on the steering wheel.

17 Claims, 5 Drawing Sheets

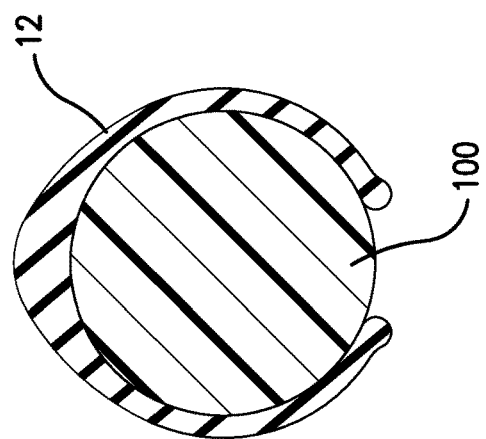
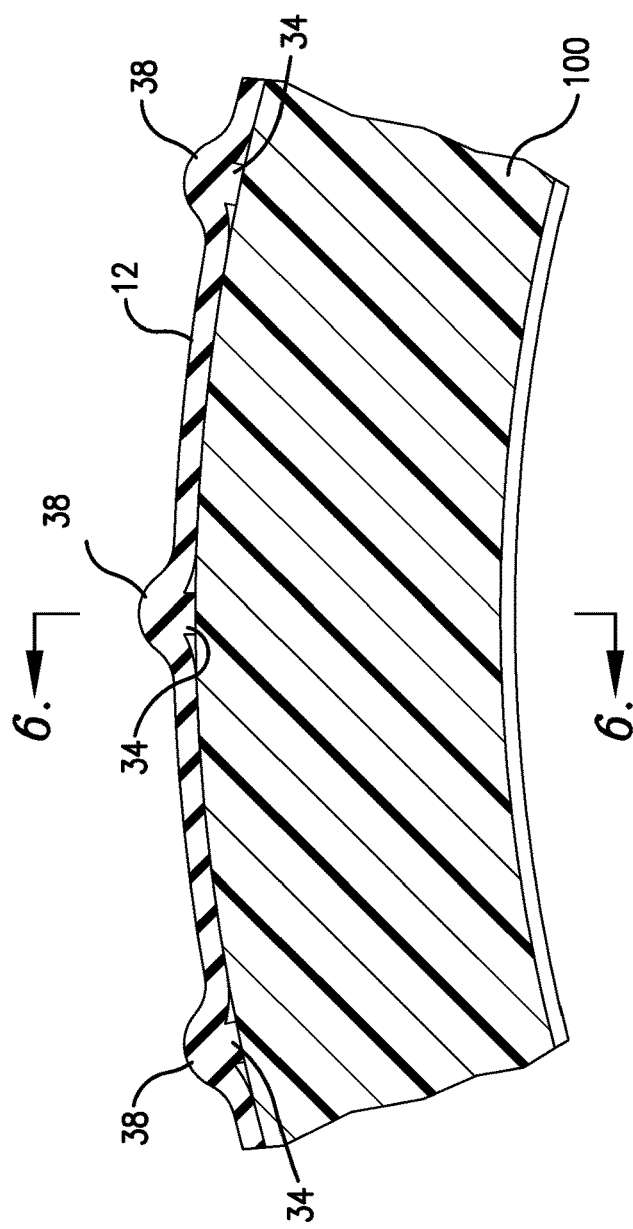

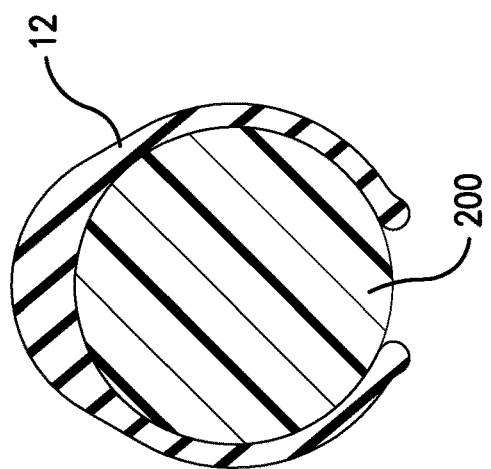
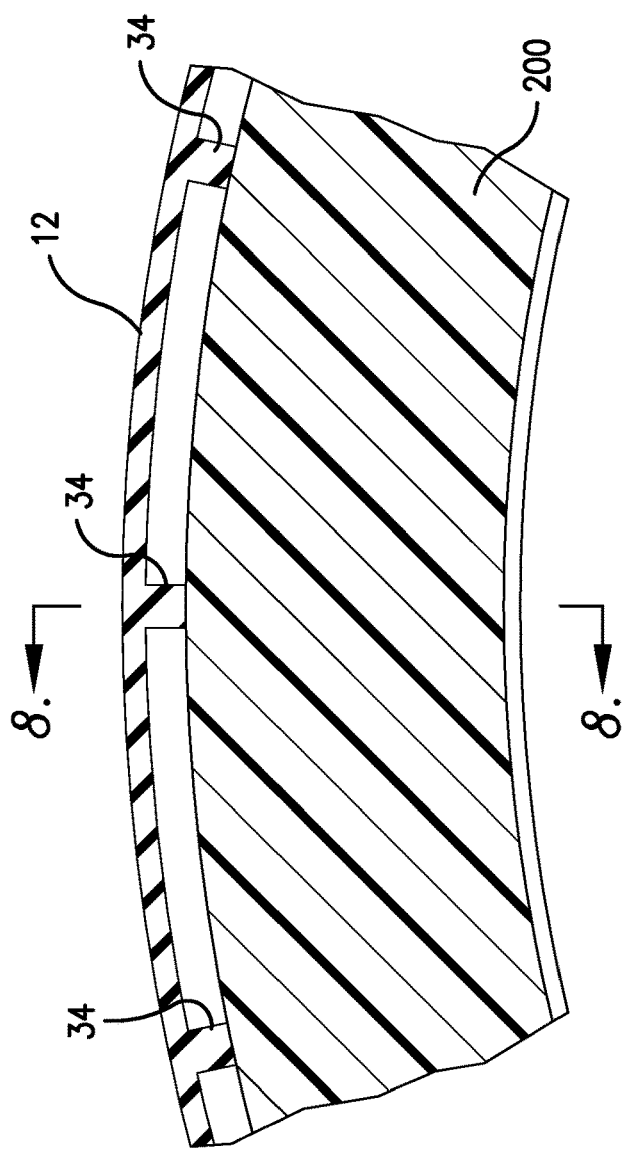

UNIVERSAL STEERING WHEEL COVER

BACKGROUND

Steering wheel covers are often installed over vehicle steering wheels to enhance grip and comfort, personalize vehicle interiors, and protect the steering wheels from excessive wear. One type of steering wheel cover includes a semi-rigid core and an outer casing made of fabric, leather, or other material. The core provides shape and cushioning and keeps the steering wheel cover in place on the steering wheel, and the casing provides grip and ornamentation.

Prior art steering wheel covers are typically designed to fit only one-sized steering wheel and must be made and sold in various sizes, increasing manufacturing costs and shelf space requirements. Multiple steering wheel cover sizes also confuse consumers, as many people don't know the size of their steering wheels. Some attempts have been made to produce steering wheel covers that fit more than one size of steering wheel, but such covers are either difficult to install on relatively larger steering wheels and/or slide or otherwise shift on relatively smaller steering wheels.

SUMMARY

The present invention solves the above-described problems by providing an improved steering wheel cover that can fit over steering wheels of different sizes without sliding or shifting once installed.

An embodiment of the steering wheel cover broadly comprises an inner core and an outer casing wrapped around the core. The inner core has a tubular body portion and a pair of spaced-apart spines. The tubular body portion and spines together define an open-ended hollow channel that can be placed over a vehicle steering wheel via a gap between the spines.

In accordance with an important aspect of the present invention, the inner core has a plurality of crush ribs extending inwardly from an inner surface of the body portion. The crush ribs allow the inner core to be easily placed over multiple different sized steering wheels without slipping or otherwise moving on the steering wheel and without tearing or excessively stretching the core. When the core is placed over a relatively larger steering wheel, the crush ribs engage the outer surface of the steering wheel and compress against the steering wheel. When the core is placed over a relatively smaller steering wheel, the crush ribs engage the outer surface of the steering wheel but compress less so as to bridge a gap between the inner core and the smaller steering wheel. When applied to all sizes of steering wheels, the crush ribs also create ridges or bumps in the outer surface of the body portion that improve the grip of the cover, with the ridges/bumps being more pronounced when the inner core is placed on a relatively larger steering wheel.

Some embodiments of the inner core further include a plurality of relief cuts in the body portion. The relief cuts permit the inner core to be stretched over steering wheels having diameters as large as 16 inches without tearing or excessively stretching the inner core. The relief cuts also cooperate with the crush ribs to allow the inner core to be placed over and firmly supported on steering wheels having diameters as small as 14 inches.

BRIEF DESCRIPTION OF THE DRAWING FIGURES

Embodiments of the present invention are described in detail below with reference to the attached drawing figures, wherein:

FIG. 5 is a fragmentary sectional view of the inner core shown on a steering wheel having a relatively larger diameter;

FIG. 6 is a sectional view of the inner core taken along line 6/6 of FIG. 5;

FIG. 7 is a fragmentary sectional view of the inner core shown on a steering wheel having a relatively smaller diameter; and FIG. 8 is a sectional view of the inner core taken along line 8/8 of FIG. 7.

Figure 1:
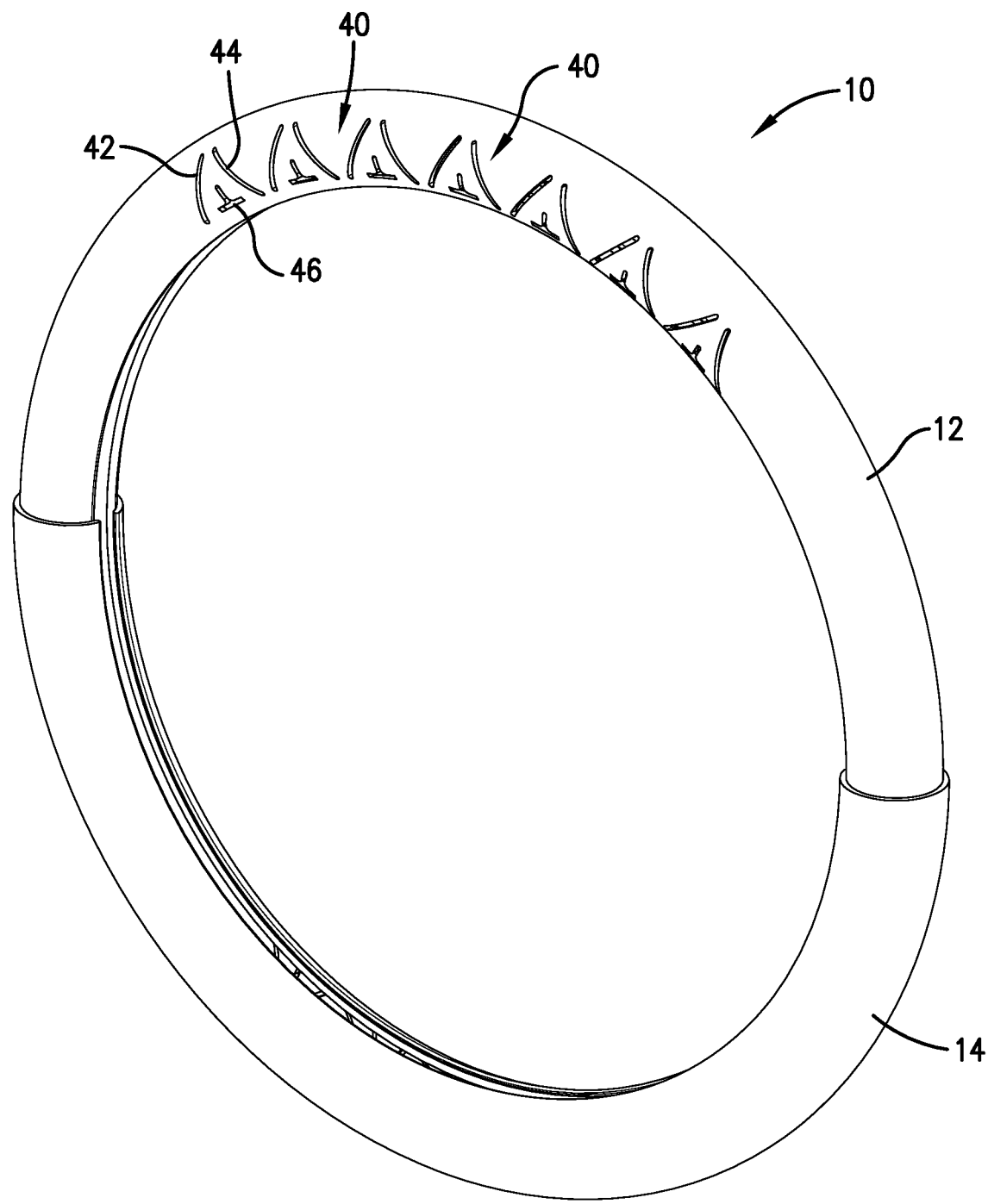
FIG. 1 is a perspective view of a steering wheel cover constructed in accordance with an embodiment of the invention and shown with part of its outer casing removed to reveal the underlying inner core.
Figure 2:
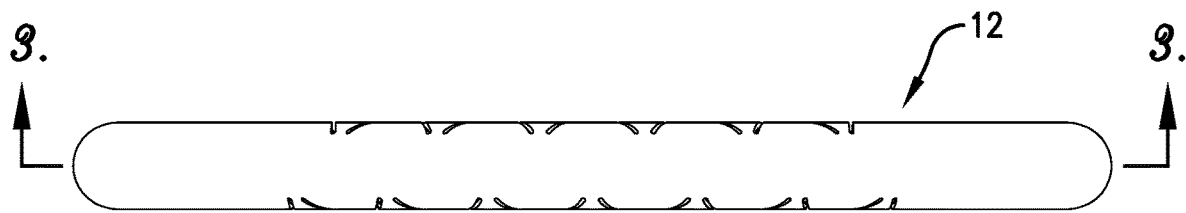
FIG. 2 is a top plan view of the inner core of the steering wheel cover.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The present invention provides an improved steering wheel cover that can fit over steering wheels of different sizes without sliding or shifting once installed and without tearing or excessively stretching the cover. An embodiment of the steering wheel cover 10 is shown in the drawing figures and broadly comprises an inner core 12 and a casing 14 wrapped around or otherwise attached around the core 12. The core 12 provides shape and cushioning and keeps the steering wheel cover 10 in place on the steering wheel, and the casing 14 provides grip and ornamentation.

Figure 3:
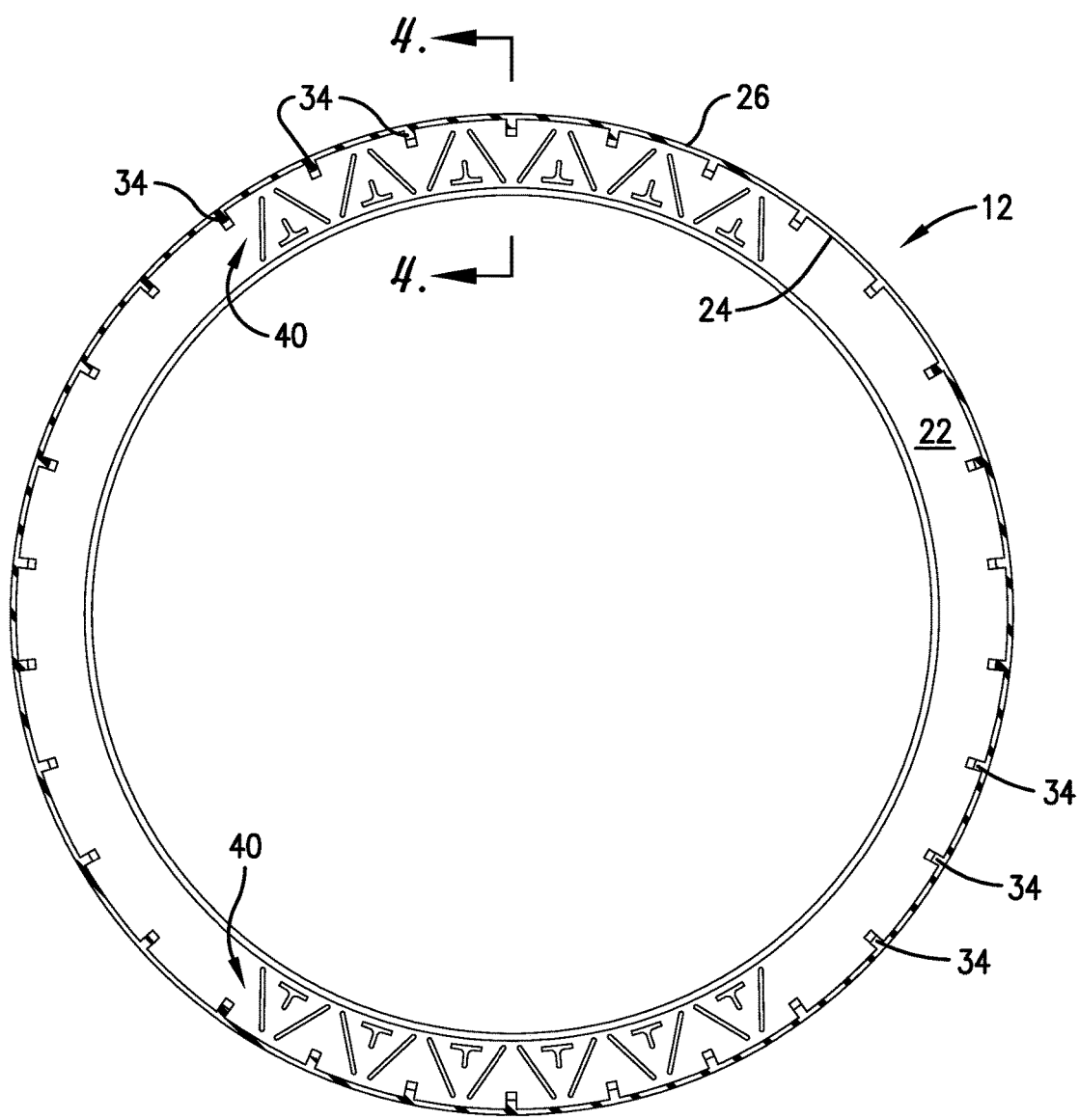
FIG. 3 is a sectional view of the inner core taken along line 3/3 of FIG. 2.
Figure 4:
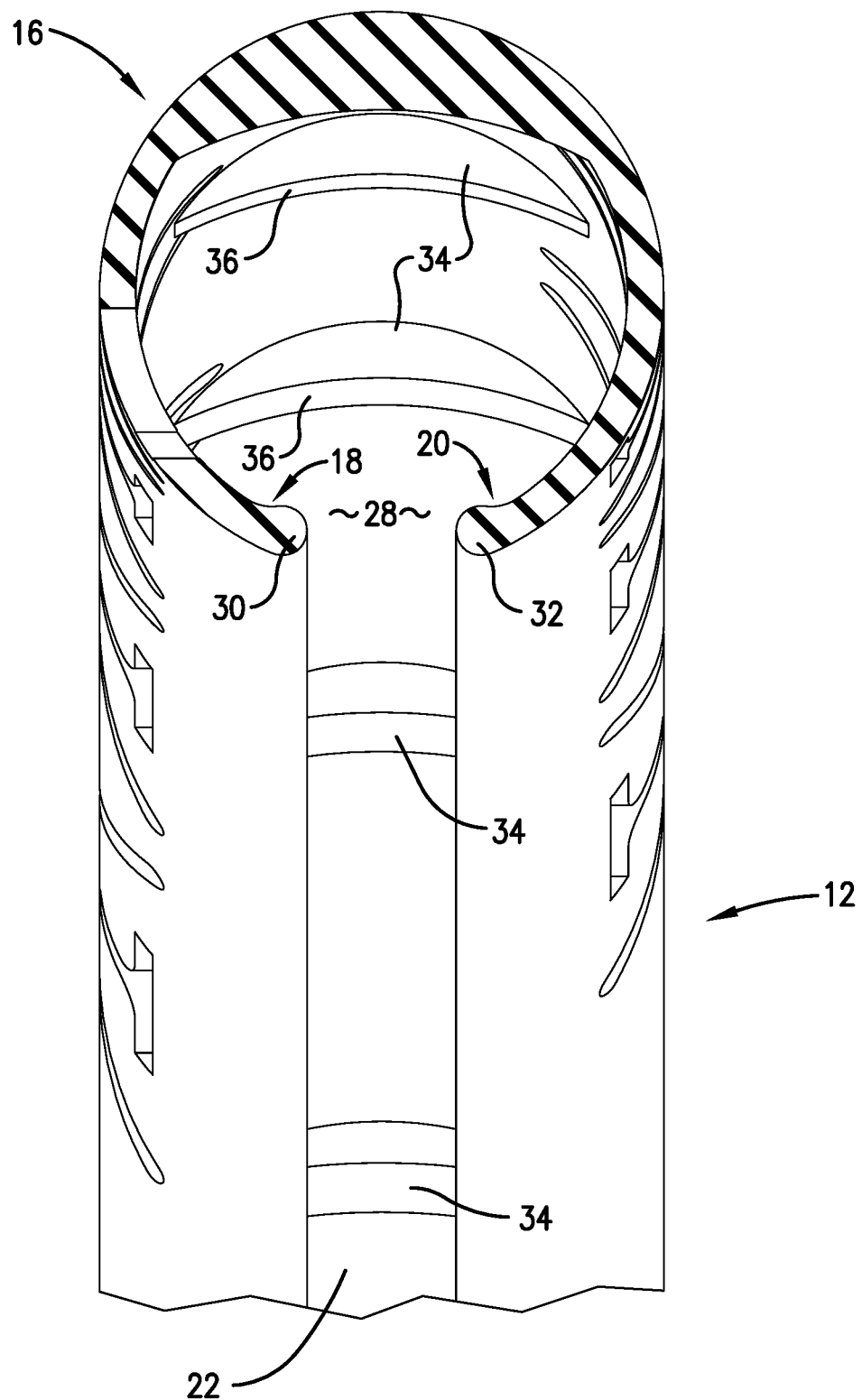
FIG. 4 is a sectional view of the inner core taken along line 4/4 of FIG. 3.

The inner core 12 may be formed of TPE material, molded EVA foam, rubber, or any other suitable material. Referring primarily to FIGS. 3 and 4, an embodiment of the inner core 12 includes a tubular body portion 16 and a pair of spaced-apart spines 18, 20. The tubular body portion 16 and spines 18, 20 together define an open-ended hollow channel 22 that can be placed over a vehicle steering wheel via a gap between the spines.

As best shown in FIG. 3, the tubular body portion 16 is circular and has an inner surface 24 and an outer surface 26. In one embodiment, the body portion has an outside diameter of approximately 15-16" and a wall thickness (material thickness) of approximately 0.055".

As best shown in FIG. 4, the spines 18, 20 are integrally formed on ends of the body portion 16 and are separated by a gap 28. The end of each spine may terminate in an enlarged lip 30, 32. The spines and/or lips may be gripped when installing the core over a steering wheel and help keep the core firmly on the steering wheel once installed.

In accordance with an important aspect of the present invention, the inner core also has a plurality of crush ribs 34 extending inwardly from the inner surface 24 of the body portion. The crush ribs 34 allow the inner core to be easily placed over multiple different sized steering wheels without slipping or otherwise moving on the steering wheel. When the core is placed over a relatively larger steering wheel, the crush ribs engage the outer surface of the steering wheel and compress against the steering wheel. When the core is placed over a relatively smaller steering wheel, the crush ribs engage the outer surface of the steering wheel but compress less so as to bridge a gap between the inner core and the smaller steering wheel. When applied to all sizes of steering wheel, the crush ribs also create ridges or bumps 38 in the outer surface of the body portion, with the ridges/bumps being more pronounced when the inner core is placed on a relatively larger steering wheel. The ridges/bumps improve the grip of the steering wheel cover.

In one embodiment, the crush ribs 34 are spaced approximately 1-2 inches apart along the inside circumference of the body portion. In other embodiments, the crush ribs are spaced 0.5"-5" apart. In one embodiment, the crush ribs are integrally formed with the inner surface 24 of the body portion. In other embodiments, the crush ribs 34 are attached to the body portion rather than being integrally formed with the body portion.

As best shown in FIG. 4, an embodiment of the crush ribs 34 are crescent-shaped, with each crush rib having a flat arcuate edge 36 that engages the outer circumference of a steering wheel when the core is placed over the steering wheel. In one embodiment, the midpoint of each arcuate edge extends ¼-½ inches from the inner surface 24 of the body portion. In another embodiment, the midpoint of each arcuate edge extends ½-2 inches from the inner surface 24 of the body portion. Other embodiments of the crush ribs may be of other shapes and sizes.

FIGS. 5 and 6 show the core 12 on a steering wheel 100 having a relatively larger diameter. In one embodiment, the relatively larger steering wheel 100 has an outside diameter of 15.5-16 inches, but it may be of other sizes. As shown, the crush ribs 34 compress against the steering wheel 100 to permit the core to be easily stretched over the larger steering wheel.

FIGS. 7 and 8 show the inner core 12 on a steering wheel 200 having a relatively smaller diameter. In one embodiment, the steering wheel 200 has an outside diameter of 14-15 inches, but it may be of other sizes. As shown, the crush ribs bridge the gap between the steering wheel and the inner surface of the body portion to keep the inner core from slipping or otherwise moving relative to the steering wheel.

As best shown in FIG. 5, the crush ribs 34 also push the outer surface of the core outward, especially when the inner core is placed on a larger diameter steering wheel. This create the ridges or bumps 38 in the outer surface of the core, which improve the grip of the steering wheel cover.

As best shown in FIGS. 1 and 3, some embodiments of the inner core 12 further include a plurality of sets of relief cuts 40 in the body portion. The relief cuts permit the inner core to be stretched over steering wheels having diameters as large as 16 inches without tearing or excessively stretching the core. And the relief cuts 40 and crush ribs 34 together permit the core to be placed over and firmly supported on steering wheels having diameters as small as 14 inches. In one embodiment, the relief cuts and crush ribs together permit the core to be stretched over steering wheels that are 0.5" greater in diameter than the core, and the crush ribs allow the core to be firmly positioned on steering wheels that are 0.5" less in diameter than the core. In other embodiments, the relief cuts and crush ribs together permit the core to be stretched over steering wheels that are 1" greater in diameter than the core, and the crush ribs allow the core to be firmly positioned on steering wheels that are 1" less in diameter than the core.

In some embodiments, each set of relief cuts 40 includes two angled linear cuts 42, 44 and an inverted T-shaped cut 46 between the angled linear cuts. In one embodiment, the relief cuts are narrow slits. In other embodiments, the relief cuts are wider so as to reduce the amount of material in the core. The relief cuts may be between 1/32"-¼" wide.

The outer casing 14 at least partially encloses the core 12 as shown in FIG. 1 and may be smooth or may include ridges, grooves, nubs, grips, or high-friction material for increasing a driver's grip on the steering wheel. The casing 14 may also include stylistic designs, logos, prints, patterns, and other aesthetic features. The casing 14 may be formed of sewn and/or woven fabric, vinyl, or other stretchable material. The casing 14 may be sewn, glued, or otherwise attached to the core 12.

Attachment of the wheel cover 10 to a steering wheel 100 or 200 will now be described in more detail. The spines 18, 20 of the inner core 12 are first pulled apart such that the gap 28 between the spines is larger than the diameter of the steering wheel. The wheel cover is then pulled over the steering wheel such that the spines 18, 20 are on opposite sides of the steering wheel. While the wheel cover is being pulled over the steering wheel, the relief cuts allow the inner core to expand without tearing, and the crush ribs allow the inner core to fit over relatively larger or smaller steering wheels as described above.

Although the invention has been described with reference to the embodiments illustrated in the attached drawing figures, it is noted that equivalents may be employed and substitutions made herein without departing from the scope of the invention as recited in the claims.

Having thus described various embodiments of the invention, the following includes possible patentable subject matter.

What is claimed:

1. A core for a steering wheel cover, the core comprising:
    a body portion having an inner surface and an outer surface;
    a front spine on a first end of the body portion;
    a rear spine on a second end of the body portion and spaced from the front spine by a gap;
    the body portion, the front spine, the rear spine, and the gap together defining an open-ended hollow channel that can be placed over a vehicle steering wheel;

a plurality of crush ribs extending from the inner surface of the body portion into the hollow channel, at least one of the crush ribs comprising
  a front end proximal to the first end of the body portion,
  a rear end proximal to the second end of the body portion, and
  a middle portion between the front end and the rear end and at least partially extending radially farther into the hollow channel than the front end and the rear end.

2. The core as set forth in claim 1, further comprising a plurality of relief cuts in the body portion, wherein the relief cuts and crush ribs together permit the core to be stretched over steering wheels that are 0.5" greater in diameter than the core, and the crush ribs allow the core to be firmly positioned on steering wheels that are 0.5" less in diameter than the core.

3. The core as set forth in claim 2, wherein the relief cuts comprise a plurality of linear cuts and non-linear cuts in the body portion.

4. The core as set forth in claim 1, further comprising a plurality of relief cuts in the body portion, wherein the relief cuts and crush ribs together permit the core to be stretched over steering wheels that are 1" greater in diameter than the core, and the crush ribs allow the core to be firmly positioned on steering wheels that are 1" less in diameter than the core.

5. The core as set forth in claim 1, wherein the crush ribs are spaced apart along an inside circumference of the inner surface of the body portion.

6. The core as set forth in claim 1, the front spine and the rear spine both having an enlarged lip.

7. The core as set forth in claim 1, the body portion being formed of thermoplastic elastomer (TPE) materials or molded ethylene-vinyl acetate (EVA) foam materials.

8. The core as set forth in claim 1, wherein the body portion has a thickness of approximately 0.055 inches.

9. A steering wheel cover for covering a vehicle steering wheel, the steering wheel cover comprising:
  an inner core comprising:
    a body portion having an inner surface and an outer surface;
    a front spine on a first end of the body portion;
    a rear spine on a second end of the body portion and spaced from the front spine by a gap;
    the body portion, the front spine, and the rear spine together defining a hollow channel that receives the vehicle steering wheel through the gap;
    a plurality of crush ribs extending from the inner surface of the body portion into the hollow channel, at least one of the crush ribs comprising
      a front end proximal to the first end of the body portion,
      a rear end proximal to the second end of the body portion, and
      a middle portion between the front end and the rear end and at least partially extending radially farther into the hollow channel than the front end and the rear end; and
  an outer casing that at least partially encloses the inner core.

10. The steering wheel cover as set forth in claim 9, wherein the inner core is made of thermoplastic elastomer (TPE) material or molded ethylene-vinyl acetate (EVA) foam.

11. The steering wheel cover as set forth in claim 9, the inner core further comprising a plurality of relief cuts in the body portion.

12. The steering wheel cover as set forth in claim 11, wherein the relief cuts and crush ribs together permit the core to be stretched over steering wheels that are 1" greater in diameter than the core, and the crush ribs allow the core to be firmly positioned on steering wheels that are 1" less in diameter than the core.

13. The steering wheel cover as set forth in claim 9, wherein the crush ribs are spaced apart along an inside circumference of the inner surface of the body portion.

14. A steering wheel cover for a vehicle steering wheel, the steering wheel cover comprising:
  an inner core comprising:
    a body portion having an inner surface and an outer surface;
    a front spine on a first end of the body portion;
    a rear spine on a second end of the body portion and spaced from the front spine by a gap;
    the body portion, the front spine, and the rear spine together defining a hollow channel that receives the vehicle steering wheel through the gap;
    a plurality of crush ribs extending from the inner surface of the body portion into the hollow channel, at least one of the crush ribs comprising
      a front end spaced apart from the first end of the body portion such that the crush rib does not extend to the first end of the body portion,
      a rear end spaced apart from the second end of the body portion such that the crush rib does not extend to the second end of the body portion, and
      a middle portion between the front end and the rear end and extending radially farther into the hollow channel than the front end and the rear end such that the middle portion of the crush rib provides more material to compress against the steering wheel than the front end or rear end do; and
  an outer casing that at least partially encloses the inner core.

15. The steering wheel cover as set forth in claim 14, wherein the core is made of thermoplastic elastomer (TPE) materials or molded ethylene-vinyl acetate (EVA) foam materials.

16. The steering wheel cover of claim 14, further comprising a plurality of relief cuts in the body portion.

17. The steering wheel cover as set forth in claim 14, wherein the crush ribs are spaced apart along an inside circumference of the inner surface of the body portion.

\* \* \* \* \*